Figure 1:
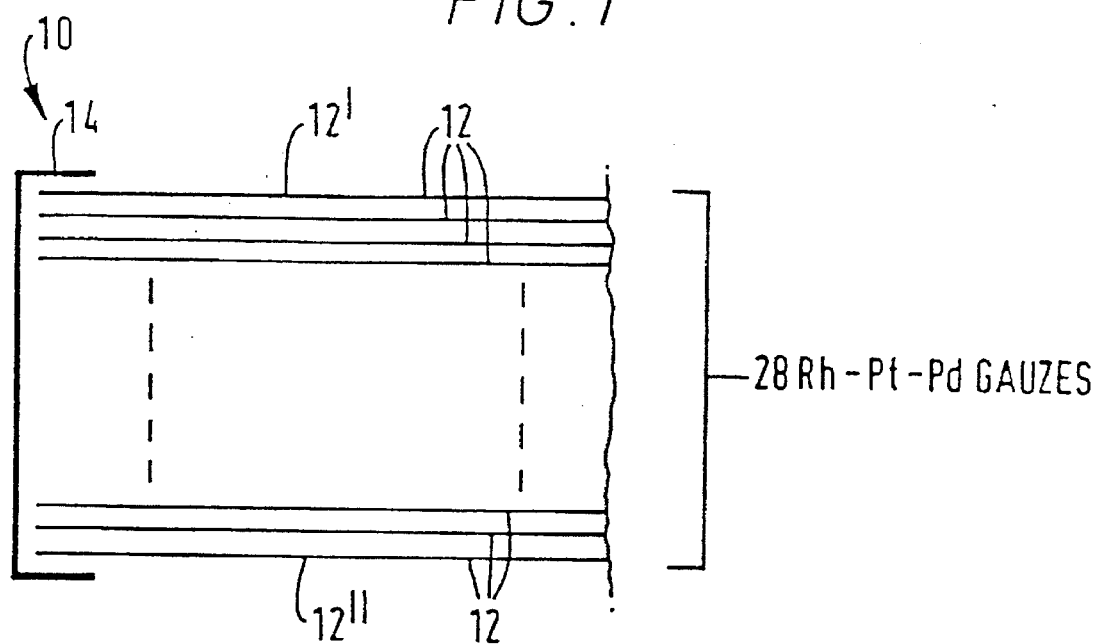

United States Patent [19]

Heywood

[11] Patent Number: 5,656,567
[45] Date of Patent: Aug. 12, 1997

[54] SELF-GETTERING CATALYSTS

[75] Inventor: Alan Edward Heywood, Hertfordshire, United Kingdom

[73] Assignee: PGP Industries, Inc., Santa Fe Springs, Calif.

[21] Appl. No.: 402,780

[22] Filed: Mar. 9, 1995

Related U.S. Application Data

[63] Continuation of Ser. No. 969,807, filed as PCT/GB91/01292, Jul. 30, 1991, abandoned.

[30] Foreign Application Priority Data

Jul. 31, 1990 [GB] United Kingdom ............... 9016788

[51] Int. Cl.$^6$ ............... B01J 23/42; B01J 23/44; C01B 21/26; C01B 21/28
[52] U.S. Cl. ............... 502/339; 502/439; 502/326; 502/313; 502/333; 502/331; 502/327; 502/334; 502/308; 502/311; 502/314; 502/315; 502/318; 502/338; 502/319; 502/320; 502/321; 502/322; 502/323; 502/337; 502/316; 423/403; 423/404
[58] Field of Search ............... 502/439, 339, 502/326, 313, 333, 331, 327, 334, 308, 311, 314, 315, 316, 318, 338, 319, 320, 321, 322, 323, 337; 423/392, 403, 404

[56] References Cited

U.S. PATENT DOCUMENTS

| | | | |
|---|---|---|---|
| 3,660,024 | 5/1972 | Gillespie | 423/403 |
| 3,873,675 | 3/1975 | Roters | 423/403 |
| 4,351,887 | 9/1982 | Bishop et al. | 502/439 X |
| 4,497,657 | 2/1985 | Hatfield et al. | 423/403 X |
| 4,774,069 | 9/1988 | Handley | 423/403 |
| 4,863,393 | 9/1989 | Farrauto et al. | 402/325 |
| 4,869,891 | 9/1989 | Handley | 423/403 |
| 5,160,722 | 11/1992 | Hochella et al. | 423/403 |
| 5,401,483 | 3/1995 | Ostroff | 502/339 X |

FOREIGN PATENT DOCUMENTS

| | | |
|---|---|---|
| 0259966 | 3/1988 | European Pat. Off. |
| 0275681 | 7/1988 | European Pat. Off. |
| 2445173 | 7/1980 | France. |
| 271501 | 9/1991 | Switzerland. |
| 2037606 | 7/1980 | United Kingdom. |
| 2062485 | 5/1981 | United Kingdom. |

OTHER PUBLICATIONS

Heywood, A.E., "Platinum Recovery in Ammonia Oxidation Plants", *Platinum Metals Review*, 17(4), 118–129 (Oct. 1973).

Darling, A.S., "The Search for Alternatives to Rhodium–Platinum Alloys", *Platinum Metals Review*, 17(4), 130–6 (Oct. 1973).

"Nitric acid catalysts: the economic significance of composition, operating conditions and recovery techniques", *Nitrogen*, 183, 27–32, (Jan.–Feb. 1990).

*Primary Examiner*—Douglas J. McGinty
*Attorney, Agent, or Firm*—Killworth, Gottman, Hagan & Schaeff, L.L.P.

[57] ABSTRACT

A catalyst unit (16), in which a quantity of a relatively expensive material such as platinum is replaced by a greater quantity of a relatively inexpensive material such as palladium. Thus, material cost saved by "tailoring" a pack is used to pay for a large quantity of a cheaper material. Although the cheaper material is generally less intrinsically efficient than the expensive material, a sufficient additional amount of the cheaper material can be used to more than compensate for this lack of efficiency. Thus, a catalytic pack of high catalytic efficiency, low material cost, low metal loss and long run duration can be produced.

14 Claims, 2 Drawing Sheets

SELF-GETTERING CATALYSTS

This application is a continuation of application Ser. No. 07/969,807, filed as PCT/GB91/01292, Jul. 30, 1991, now abandoned.

This invention relates to self-getting catalysts.

In use, catalysts can suffer greatly from material losses through volatilisation, especially during highly exothermic reactions such as the oxidation of ammonia. Where the catalyst is of precious metal, this loss can be extremely expensive, leading to greatly increased production costs. It is therefore common for getter systems to be employed, with the aim of recovering some of the material lost from the catalyst.

Getter systems typically comprise one or more catchment gauzes situated downstream of one or more catalytic gauzes to recover catalytic material present in the post-reaction gases.

Examples of getter systems are discussed in UK Patent No. 2037606. That patent also discloses a catalyst unit in which a palladium/gold alloy catchment gauze is placed in close proximity with a platinum catalytic gauze. By virtue of its composition, the catchment gauze itself has some catalytic properties and therefore, by virtue of its placement, the catchment gauze promotes the reaction initiated by the catalytic gauze. This 'self-gettering' catalyst has two main benefits. Firstly, less platinum is required to attain a given catalytic efficiency. Secondly, less platinum is lost from the catalyst in use.

UK Patent Application No. 2062486 discloses a catalyst unit comprising a pack of woven metallic gauzes in which at least some of the gauzes disposed at or towards the front of the pack are made from wire having a cross-sectional area greater than the wire of at least some of the gauzes disposed at or towards the rear of the pack. This 'tailoring' of the wire sizes is intended to reflect the well-known metal loss characteristic in which more metal tends to be lost from the gauzes at or towards the front of the pack than is lost from the gauzes at or towards the rear of the pack. Thus, the durability of each gauze is selected to suit the rate at which it is expected to erode. In this way, no more of the expensive catalytic material need be used than is necessary; in effect, the amount of catalytic material at the lightly-loaded downstream end of the pack is reduced to a minimum.

The tailored pack disclosed in UK Patent Application No. 2062486 does not, however, propose the use of catchment or getter layers to reduce metal loss from the pack. As a result, the life of the pack is undesirably limited, and metal loss is undesirably high.

It is against this background that the present invention has been made. The invention embodies a principle, namely that a quantity of a relatively expensive first material can be replaced by a relatively inexpensive second material in such a quantity as to outweigh, overcome or compensate for any intrinsic disadvantages of the second material in comparison with the first material.

For example, the first material may be platinum and the second material may be palladium. At the time of writing, platinum is approximately four times as expensive as palladium, per unit weight. Platinum is also 1.75 times denser than palladium. On the other hand however, platinum is (in some but not all cases) a more effective catalyst than palladium; it can be said that palladium is intrinsically disadvantaged in that respect with respect to platinum. Nevertheless, given the cost and density differences, approximately seven units of palladium correspond to one unit of platinum for the same overall cost. So, in a catalyst pack for example, one platinum gauze may be replaced by seven similar palladium gauzes without adding to the material cost of the pack. In many cases, such a quantity of palladium is sufficient to outweigh the intrinsic disadvantages of palladium in terms of catalytic effect, so that the catalytic efficiency of the pack is actually increased.

It will be clear that an unexpected and beneficial synergy underlies the invention. At one extreme, for a given material cost, the catalytic efficiency of a catalyst pack can be increased. At the other extreme, a given catalytic efficiency can be maintained while reducing the material cost of the pack. Of course, variations between those extremes are also possible: indeed, it has been found that the invention allows a catalyst pack to combine improved catalytic efficiency with lower material cost, as will be demonstrated.

A further important point is that palladium acts as a getter for platinum in catalyst packs. Thus, the addition of palladium catchment elements also improves the platinum loss characteristics of the pack. This is a further example of the synergy that underlies the invention.

A still further benefit of the invention is that it allows a useful increase in the average run length of a catalyst pack, without necessarily adding to material costs, detracting from catalytic efficiency, or worsening metal loss characteristics. Increasing the run length reduces plant shutdowns and thus minimises expensive downtime. The run length is increased because the palladium elements 'underpin' (compensate for) the decay of the platinum elements—as platinum is evaporated from the platinum elements, it is picked up by the palladium elements which then improve as catalysts by virtue of their increasing platinum content. In simple terms, the palladium getter always provides some catalytic effect, but becomes a better catalyst as it ages. Some platinum is inevitably lost from the unit, but the remainder simply moves from one position to another within the unit and continues to do useful catalytic work.

In addition, some studies suggest that the addition of palladium increases the resistance of a catalyst unit to degradation by organic contaminants, notably (but not exclusively) oils which may be introduced from the ammonia feed, compressor bearings etc.

The various potential benefits of the invention may be expressed in terms of four performance indicators, i.e. 1. improved catalytic efficiency; 2. improved metal loss characteristics; 3. increased run time; and 4. increased resistance to organic contamination. A further potential benefit (not strictly a performance benefit) is, of course, reduced material costs. Naturally, benefit may be gained by improving one or more of the four performance indicators (not necessarily all of them), and/or by reducing material costs. In this specification, references to improved 'performance' are intended to indicate that one or more of the four performance indicators have been improved.

The invention may thus be expressed as a method of improving the performance and/or the cost of a catalyst unit, comprising removing a quantity of a first, relatively expensive catalytic material from a region of the unit, and replacing that quantity of the first catalytic material with a larger quantity of a second, relatively inexpensive catalytic material.

The invention may also be expressed as a catalyst unit comprising a quantity of a first catalytic material distributed non-uniformly through the unit, including a second catalytic material positioned to act as a getter for the first catalytic material and to enhance the catalytic effect of the unit.

The distribution of the first catalytic material is suitably 'tailored' such that less of the first catalytic material is situated in regions of low expected metal loss than in regions of high expected metal loss. Tailoring of the amount of the first catalytic material may be accomplished by varying the number of catalytic elements around a given position within a catalyst unit or preferably, by varying the cross-sectional area of the catalytic elements themselves.

The distribution of the second catalytic material within the pack may also be tailored in similar fashion, so that the amount of the second catalytic material at a given position within the catalyst unit is matched to the amount of the first catalytic material expected to be present in the gas stream at that position. In this respect, it will be noted that upstream getter or catchment elements generally collect more volatilised material than downstream getter or catchment elements. Thus, the downstream getter or catchment elements need not have the capacity of the upstream elements.

Elements of the second catalytic material may be separated from elements of the first catalytic material by support elements. The support elements can, for example, be stainless steel gauzes. Other types of support element include ceramic elements of Pt/Pd/Rh-coated inert elements.

Preferably, the first catalytic material is platinum or a platinum-based alloy, and the second catalyst material is palladium or a palladium-based alloy. For example, the first catalytic material is suitably a Rh-Pt-Pd alloy, with Rh present in an amount between 1 and 15 wt %, and with Pd present in an amount between 1 and 30 wt %, preferably with additions of iridium, ruthenium, molybdenum, cobalt, manganese or zirconium. A US alloy, 5%Rh-90%Pt-5% Pd, is a specific example. The second catalytic material is suitably mainly Pd with additional elements as above.

At present, rhodium is approximately forty times as expensive as palladium, weight for weight. Thus, a reduction in the amount of rhodium (e.g. by deleting a Rh-Pd-Pt gauze) involves a substantially greater cost saving than simply removing some platinum. This saving can be used to pay for still more palladium, to the further benefit of the unit's performance.

It is preferred that elements of the second catalytic material alternate with at least some elements of the first catalytic material in the unit.

The elements of the first and second catalytic materials are preferably of wire woven or knitted to form a gauze screen. Mesh sizes for the gauze of the first catalytic material can range from, say, 100 to 1500 meshes per cm$^2$, and preferably from 200 to 1200 meshes per cm$^2$. Mesh sizes for the gauze of the second catalytic material can range from, say, 30 to 1200 meshes per cm$^2$, and preferably from 50 to 1000 meshes per cm$^2$.

The diameter of wires of the first catalytic material can range, for example, from approximately 0.05 mm to 0.3 mm, and preferably from 0.05 mm to 0.15 mm. Wires of the second catalytic material are suitably in the range 0.05 mm to 0.25 mm.

Referring back now to UK Patent No. 2037606, whilst the arrangement therein is laudable for its reduced platinum content and consumption, this advantage is negated to some extent by the use of substantial amounts of gold (up to 20%) in the catchment gauzes. More seriously perhaps, gold is known to be a poison for platinum catalysts in the oxidation of ammonia. This can cause considerable difficulties, particularly bearing in mind that the gold-containing gauzes are in close proximity with, and in some cases upstream of, the platinum gauzes. A further problem is that whilst gold improves the strength of palladium, gold also significantly reduces palladium's gettering efficiency.

In view of the above problems, a further object of this invention is to develop a self-gettering catalyst arrangement which employs substantially gold-free getter materials.

With this object in view, a second aspect of the invention may be expressed as a catalyst, a getter or a self-gettering catalyst of palladium or palladium alloyed with at least one element selected from the group rhenium, iron, molybdenum, zirconium, tantalum, tungsten, cobalt, yttrium, thorium, ruthenium, iridium, osmium, rhodium, nickel, copper and chromium.

In Pd-Zr alloys, it is preferred that zirconium content does not exceed 2 wt %. In alloys of palladium with any other element in the group, it is preferred that the content of that other element does not exceed 8 wt %.

In general, it is desirable for an alloying element to increase the melting point of palladium (or at least not to reduce its melting point unduly), thereby minimising self diffusion and grain growth, and resultant expansion effects, under high-temperature conditions in use, which can occur with pure palladium. Also, as gettering depends upon diffusion of platinum into the lattice of the catchment material, gettering efficiency may be expected to increase as the lattice constant of palladium is increased. It is therefore also desirable that the alloying element acts to increase the lattice constant of palladium.

Of the elements in the specified group:
(i) rhenium causes little or no reduction in melting point and, in small quantities, increases hardness markedly. Also, platinum readily alloys with rhenium.
(ii) iron increases the lattice constant, and is very cheap;
(iii) molybdenum increases the melting point of the alloy.
(iv) addition of zirconium does not significantly reduce the melting point of palladium and increases its lattice constant. also, zirconium can be slagged off as the oxide on melting. It is also envisaged that a degree of internal hardening may take place in use. Zirconium may even be partially or fully oxidised before use to produce a dispersion strengthened alloy with excellent high temperature characteristics.
(v) tantalum increases the melting point of the alloy.
(vi) tungsten raises the melting point of palladium considerably whilst largely maintaining its lattice constant.
(vii) cobalt can become oxidised in use to form cobalt oxide, which is itself a catalyst in the oxidation of ammonia. Thus, it is envisaged that cobalt may enhance the catalytic properties of palladium when used for this reaction.
(viii) ruthenium, iridium, osmium and rhodium all raise the melting point of palladium.

The invention further includes a catalyst unit as defined in accordance with the first aspect of the invention, comprising catalyst, getter, or self-gettering catalyst elements as defined in accordance with the second aspect of the invention.

Figure 2:
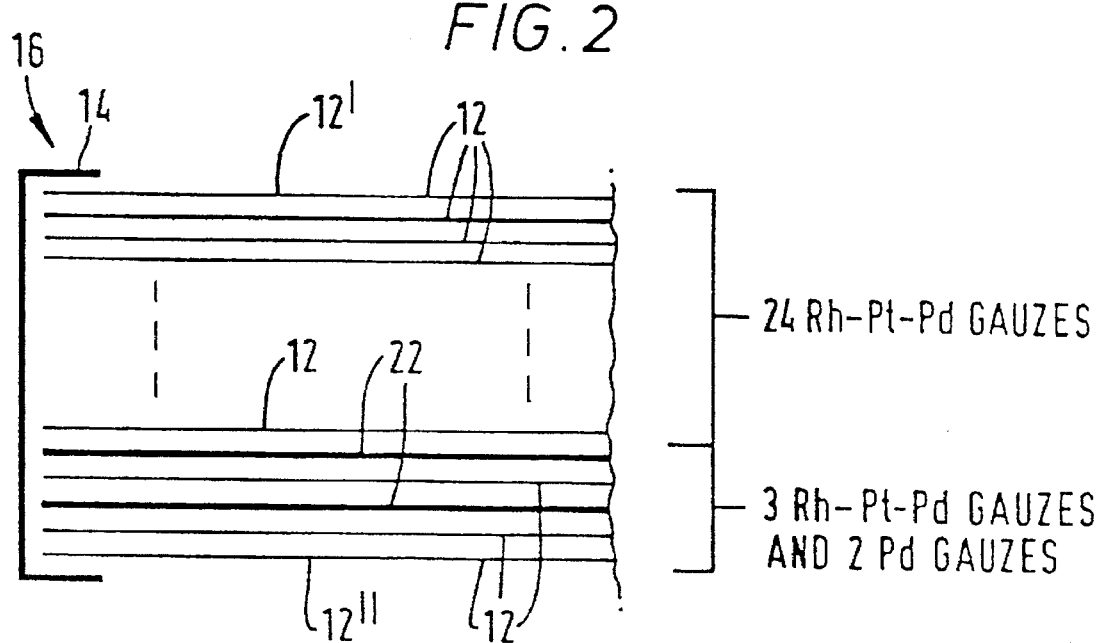
Figure 3:
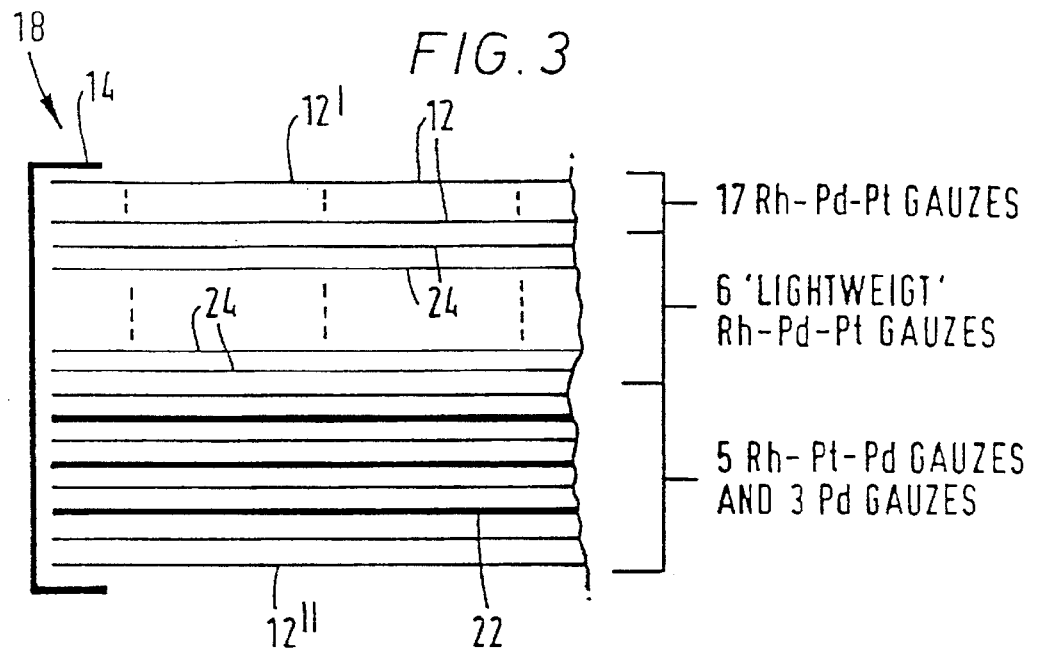
Figure 4:
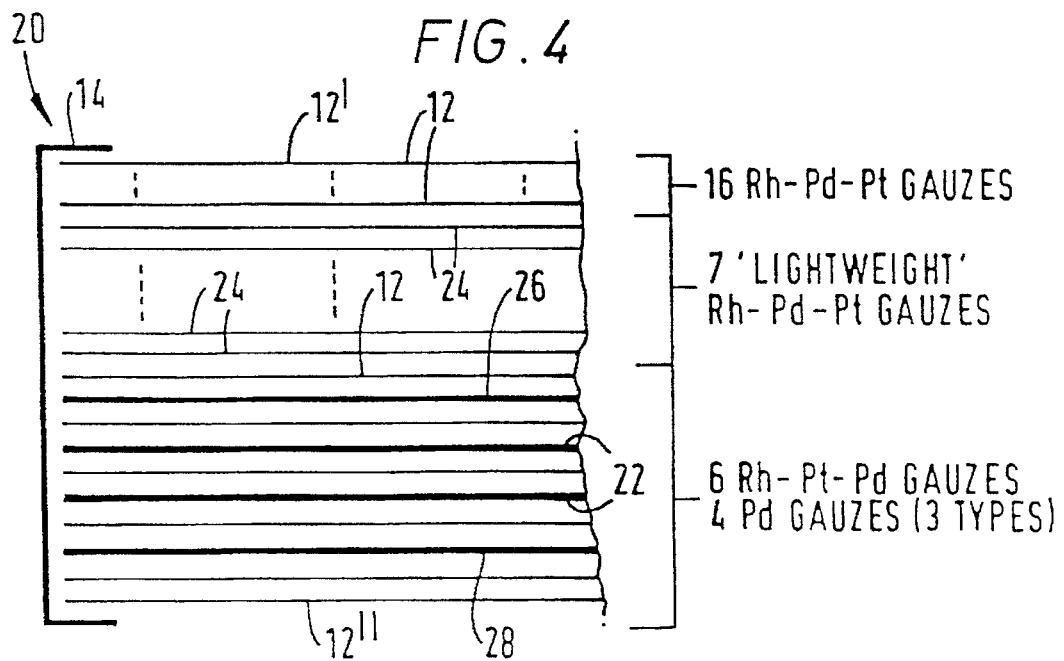

In order that this invention may be more readily understood, embodiments thereof will now be described, by way of example only, with reference to the accompanying drawings in which:

FIG. 1 is a schematic partial cross-sectional view through a typical known catalyst pack; and FIGS. 2, 3 and 4 are schematic partial cross-sectional views through catalyst packs constructed in accordance with this invention.

Referring to FIG. 1, a typical known catalyst pack 10 comprises a plurality of catalytic gauzes 12. In the example shown, twenty-eight identical 5% Rh-90% Pt-5% Pd gauzes 12 lie one above another. The gauzes 12 are connected at their edges by a heat resistant alloy foil 14 such as nickel alloy which overlaps an edge portion of the top and bottom gauzes 12 (denoted 12' and 12" respectively).

The gauzes 12 are typically woven from wire 0.003" (0.0762 mm) in diameter, with 1024 meshes per cm². The gauze diameter is 43¾ inches. Such a configuration is suitable for a plant used to produce 450 tonnes/day of nitric acid ($HNO_3$) from ammonia ($NH_3$).

Referring now to FIGS. 2, 3 and 4, catalyst packs 16, 18, and 20 constructed in accordance with the invention are similar in outward appearance to the typical pack 10 shown in FIG. 1. That is to say, they have a top gauze 12', a bottom gauze 12", and a nickel alloy foil 14. The packs 16, 18 and 20 differ from the typical pack 10 in their internal configuration, as follows:

Pack 16 of FIG. 2 contains a total of twenty-seven Rh-Pt-Pd gauzes 12 supplemented by two Pd gauzes 22. The Pd gauzes 22 are of 0.18 mm wire, with 140 meshes per cm². Moving downstream through the pack 16, there are twenty-four Rh-Pt-Pd gauzes 12, one Pd gauze 22, one Rh-Pt-Pd gauze 12, one Pd gauze 22, and two Rh-Pt-Pd gauzes 12. As the Pd gauzes 22 replace one of the Rh-Pt-Pd gauzes 12 of the typical pack and are situated adjacent the downstream end of the pack 16, it can be said that the pack 16 is tailored, albeit simply, to suit the expected 'front-loaded' metal loss profile. That is to say, the amount of Rh-Pt-Pd catalytic material in the downstream region of the pack 16 is reduced with respect to the upstream region of the pack 16.

Pack 18 of FIG. 3 contains a total of twenty-two Rh-Pt-Pd gauzes 12 plus a group of six lightweight Rh-Pt-Pd gauzes 24, supplemented by three Pd gauzes 22 adjacent the downstream end of the pack. Moving downstream through the pack, there are seventeen Rh-Pt-Pd gauzes 12, six lightweight Rh-Pt-Pd gauzes 24, one Rh-Pt-Pd gauze 12, one Pd gauze 22, one Rh-Pt-Pd gauze 12, one Pd gauze 22, one Rh-Pt-Pd gauze 12, one Pd gauze 22 and two Rh-Pd-Pt gauzes 12. The lightweight Rh-Pt-Pd gauzes 24 are similar in mesh size to the ordinary Rh-Pt-Pd gauzes 12 and are of similar composition, but consist of wires 0.063 mm (nominally 0.060 mm) in diameter as opposed to 0.0762 mm in diameter. Thus, the pack 18 of FIG. 3 contains a profile of catalytic Rh-Pt-Pd elements that is more finely 'tailored' in accordance with the expected metal loss profile.

Pack 20 of FIG. 4 contains a total of twenty-two Rh-Pt-Pd gauzes 12 plus a group of seven lightweight Rh-Pt-Pd gauzes 24, supplemented by two Pd gauzes 22, one Pd gauze 26, and one Pd gauze 28. The Pd gauze 26 is of 0.19 mm diameter wire and has 100 meshes per cm². The Pd gauze 28 is of 0.15 mm diameter wire and has 150 meshes per cm². Thus, the Pd layers are also tailored in this example, in order to match them to the amount of platinum expected to be present in the gas stream at each location in the pack. It has been observed that upstream catchment gauzes tend to collect a greater quantity of platinum than downstream catchment gauzes; thus, the upstream catchment gauzes should, ideally, have a relatively greater resistance to saturation.

Moving downstream through the pack 20, there are sixteen Rh-Pt-Pd gauzes 12, seven lightweight Rh-Pt-Pd gauzes 24, one Rh-Pt-Pd gauze 12, one Pd gauze 26, one Rh-Pt-Pd gauze 12, one Pd gauze 22, one Rh-Pt-Pd gauze 12, one Pd gauze 22, one Rh-Pt-Pd gauze 12, one Pd gauze 28, and two Rh-Pt-Pd gauzes 12.

Whilst it is preferred that the Pd gauzes 22, 26, 28 are concealed within the pack so that the customer is presented with a unit of familiar appearance, it is also possible to arrange the pack such that one of the Pd gauzes 22, 26, 28 is exposed.

A common feature of all of the above examples in that the Pd gauzes 22, 26, 28 in effect replace one or more of the Rh-Pd-Pt gauzes 12, 24 near the downstream end of each pack. Thus, the number of Rh-Pd-Pt gauzes in the downstream portion of each pack is tailored to some extent to suit the relatively low metal loss expected at that end of the pack. The material cost saved by removing or lightening the Rh-Pd-Pt gauzes 12 allows the substitution of more, cheaper Pd gauzes 22, 26, 28. As will be shown below, this provides a highly desirable combination of lower total material cost, higher catalytic efficiency, lower platinum loss, and longer run length.

The following table, TABLE 1, sets out some advantages of the invention, based upon trials of the known pack illustrated in FIG. 1 and the novel packs illustrated in FIGS. 2, 3 and 4. The table assumes the following material costs: Pt US$500/oz., Pd US$120/oz.; and Rh US$5,000/oz.

TABLE 1

| Sample | FIG. 1 | FIG. 2 | FIG. 3 | FIG. 4 |
| --- | --- | --- | --- | --- |
| Material costs (U.S. dollars) | 368,120 | 359,480 | 349,540 | 341,120 |
| Platinum losses (gm/ton) | 0.29 | 0.25 | 0.23 | 0.2175 |
| % Reduction in platinum losses | — | 14 | 20 | 25 |
| Av. run length (weeks) | 38 | 49 | 52 | 53 |

As can be seen, the invention allows a marked reduction in material costs, a substantial reduction in platinum losses, and a substantial increase in the average run length. The increased average run length is indicative of improved catalytic efficiency. This is because the end of a run is usually determined by the catalytic efficiency falling below a given threshold level. Thus, the higher the efficiency at the start of a run, and the shallower the gradient of the efficiency decay curve, the longer the run will be before the threshold level is crossed.

It is estimated that over the course of a year, the above examples will produce cost benefits of between US$80,000 and US%150,000.

I claim:

1. A catalyst unit for the oxidation of ammonia including an upstream region and a downstream region, said unit consisting essentially of a quantity of a first catalytic material comprised of one or more elements, said first catalytic material distributed non-uniformly through the unit such that less of said first catalytic material is situated in the downstream region of said unit than said upstream region of said unit, and a quantity of a second catalytic material comprised of one or more elements, said second catalytic material positioned to act as a getter for the first catalytic material thereby improving the catalytic effectiveness of the unit by both contributing a catalytic effect and acting as a getter for the first catalytic material, wherein the first catalytic material is platinum or a predominately platinum alloy having a palladium content, if any, of less than 30 wt % of the alloy and the second catalytic material is palladium or a predominately palladium alloy and is substantially free of gold.

2. A catalyst unit as claimed in claim 1, wherein the second catalytic material is intrinsically less efficient as a catalyst than the first catalytic material, but is present in such a quantity as to outweigh, compensate for, or overcome its relative inefficiency as a catalyst in comparison to the first catalytic material to produce a unit having greater performance than a unit of equal or greater material cost consisting entirely of the first catalytic material.

3. A catalyst unit as claimed in claim 1, wherein the second catalytic material is intrinsically less efficient as a catalyst than the first catalytic material, but is present in such a quantity as to outweigh, compensate for, or overcome its relative inefficiency as a catalyst in comparison to the first catalytic material to produce a unit having lower material cost than a unit of equal or lesser performance consisting entirely of the first catalytic material.

4. A catalyst unit as claimed in claim 1, wherein the second catalytic material is concentrated in a downstream region of the unit.

5. A catalyst unit as claimed in claim 1, wherein the quantity of the second catalytic material is distributed non-uniformly.

6. A catalyst unit as claimed in claim 1, wherein elements of the second catalytic material alternate with at least some elements of the first catalytic material.

7. A catalyst unit as claimed in claim 1 in which the first and second catalytic materials comprise a pack of layers.

8. A catalyst unit as claimed in claim 7, wherein each layer of said catalytic materials is a wire gauze.

9. A catalyst unit as claimed in claim 8, wherein the wire gauze is knitted.

10. A catalyst unit as claimed in claim 8, wherein the second catalytic material is situated internally of the unit.

11. A catalyst unit as claimed in claim 1, wherein the second catalytic material is incorporated into a layer of the first catalytic material or into a supporting or separating layer.

12. A method of improving the performance of a catalyst unit for the oxidation of ammonia in which said catalyst unit includes a downstream region and an upstream region, said method consisting essentially of removing a quantity of a first catalytic material comprised of one or more elements from a region of the unit, and replacing that quantity of the first catalytic material with a greater quantity of a second catalytic material comprised of one or more elements which is relatively inexpensive as compared to the first catalytic material, said first catalytic material being distributed non-uniformly through said unit such that less of the catalytic material is positioned in the downstream region of the unit than the upstream region of the unit; and positioning said second catalytic material to improve the catalytic effectiveness of the unit by both contributing a catalytic effect and acting as a getter for said first catalytic material wherein the first catalytic material is platinum or a predominately platinum alloy having a palladium content, if any, of less than 30 wt % of the alloy and the second catalytic material is palladium or a predominately palladium alloy and is substantially free of gold.

13. A method as claimed in claim 12, wherein the first and second catalytic materials comprise a pack of layers, and the first catalytic material is removed from a downstream region of the pack.

14. A catalyst unit as claimed in claim 1, wherein the second catalytic material comprises palladium or palladium alloyed with at least one element selected from the group rhenium, iron, molybdenum, zirconium, tantalum, tungsten, cobalt, yttrium, thorium, ruthenium, iridium, osmium, rhodium, nickel, copper and chromium.

* * * * *